June 25, 1968 W. R. TARASUK ET AL 3,390,053
FLEXIBLE SPACER FOR A NUCLEAR REACTOR FUEL ASSEMBLY
Filed Nov. 2, 1966 2 Sheets-Sheet 1

Inventors.
WALTER R. TARASUK
PLEMAN E. BESSEY
PAUL D. SCHOLFIELD
By Kimmel, Crowell & Weaver Attorneys.

United States Patent Office 3,390,053
Patented June 25, 1968

3,390,053
FLEXIBLE SPACER FOR A NUCLEAR
REACTOR FUEL ASSEMBLY
Walter R. Tarasuk, Pleman E. Bessey, and Paul D. Scholfield, Peterborough, Ontario, Canada, assignors to Atomic Energy of Canada Limited, Ottawa, Ontario, Canada., a corporation of Canada
Filed Nov. 2, 1966, Ser. No. 591,569
Claims priority, application Canada, Dec. 31, 1965, 948,999
9 Claims. (Cl. 176—78)

ABSTRACT OF THE DISCLOSURE

A fuel rod assembly for a nuclear reactor is described in which the elements have thin metal sheaths and a flexible spacer separates the elements. The spacer consists of a wire bent to form a pair of attachment portions to the sheaths of adjacent elements with a transverse portion joining the two attachment portions. The attachment portions are secured to the sheaths of adjacent elements such as by welding with the point of attachment offset from the line of action of force acting through the transverse portion.

---

This invention relates to fuel rod structures for nuclear reactors.

It has been found desirable to construct the fuel for reactors in individual pieces as rods so that they may be simply and easily inserted into or withdrawn from the reactor. It has also been found desirable to construct the rods as an assembly of smaller pieces or elements. In general each element is elongated and consists of a mass of reactive material, such as uranium dioxide, sheathed in a metal tube or cladding. In heavy water moderated reactors the cladding is a zirconium alloy such as Zircalloy 2. The cladding serves as a protection for the fuel from the corrosive conditions in the reactor, and also prevents fuel fission products from entering into the coolant and being distributed throughout the reactor.

A particularly suitable method of fuel rod assembly has been firstly to arrange the elements in triple clusters or trefoils and then to join these trefoils together to make a fuel rod. In current Canadian practice, rods consisting of 19 elements are formed by uniting six trefoils about a centre element and in 28 element rods by arranging eight trefoils about a central quadrafoil.

It is necessary that spaces be allowed between the elements to permit the circulation of coolant and also to avoid contact and fretting between the claddings of adjacent elements which may occur from bowing and unequal expansion of the elements due to heating and cooling as the reactor power level changes. To separate the elements, spacers are arranged between adjacent elements in one or more planes transverse to the longitudinal direction of the elements and the present invention relates to a new and improved type of spacer.

In accordance with the invention there is provided in a rod comprising at least a pair of longtiudinally extending elements subject to differential movement each of said elements including a thin metal sheath, a flexible spacer which comprises a wire bent to form a pair of attachment portions and a transverse portion extending between the attachment portions, and means securing each attachment portion to the sheath of its adjacent element, said securing means being perpendicularly offset from the the line of action of force between said elements acting through said transverse portion.

Figure 1:
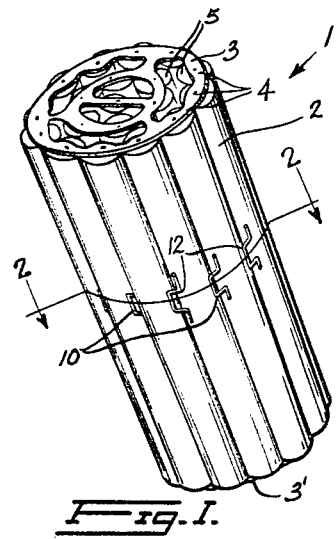
Figure 2:
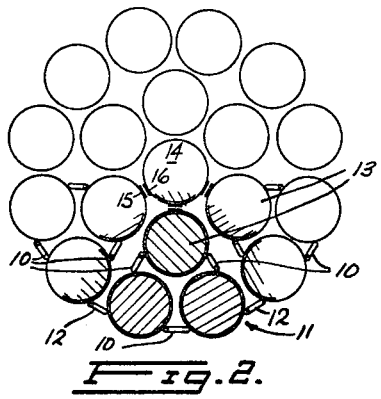
Figure 3:
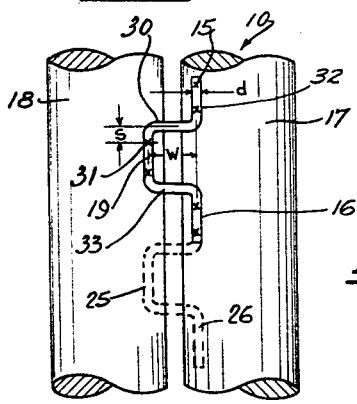
Figure 4:
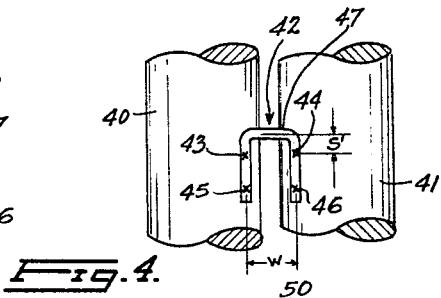
Figure 5:
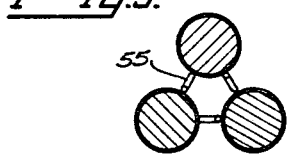
Figure 6:
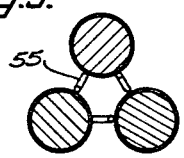
Figure 7:
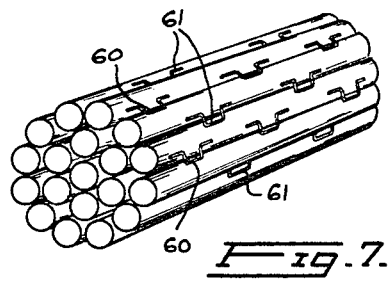
Figure 8:
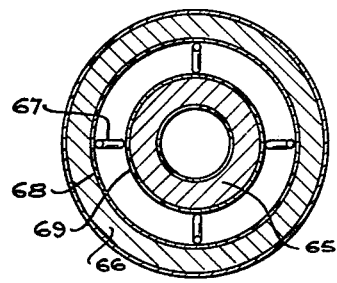

A description of the invention now follows in which reference will be made to the accompanying drawings in which:

FIGURE 1 shows a perspective view of a fuel rod comprising a bundle of trefoils,
FIGURE 2 is a section along line 2—2 of FIGURE 1,
FIGURE 3 shows a side view of two outer elements in a trefoil bundle giving details of hte spacers according to the invention,
FIGURE 4 shows a side view of an alternative spacer,
FIGURE 5 shows a side view of a further alternative spacer,
FIGURE 6 shows an end view in section of a trefoil with another arrangement of spacers,
FIGURE 7 shows a perspective view of a rod with spacers alternately arranged in different longitudinal planes, and
FIGURE 8 shows a cross-sectional view of a rod using annular fuel elements.

As can be seen from FIGURE 1, a typical fuel rod 1 comprises elements 2 joined together at their ends by suitable means such as flexible spider plates 3 and 3'. The cladding end caps 5 of each of the elements 2 are joined to the plate 3 in positions such as the points 4. It is desirable that the end plate 3 be flexible so that elements 2 may have limited longitudinal movement with respect to one another. The second end plate 3' can be seen in FIGURE 1.

In accordance with one aspect of the invention, crank-shaped flexible spacers 10 are placed between the claddings of adjacent elements in a trefoil such as 11 seen in FIGURE 2, preferably offset from the line joining the longitudinal axes of the two adjacent fuel elements. In heavy water moderated reactors the spacers are suitably made of Zircalloy wire which will resist corrosion, and may be joined to the element cladding by methods of welding or brazing. Typically the crank-shaped spacer 10 may be joined to one element 17 by two spot welds at each of its end arms 15 and 16, and also by two spot welds to the adjacent element 18 in its straight median attachment 19. Ends 15 and 16 are joined to median 19 by transverse portions 30 and 33. A continuous weld along the portions touching the claddings may also be used. If it is desirable to increase the bond between elements, the spacer may be lengthened as shown in broken lines in FIGURE 3 by including additional median portions 25 welded to element 18, and an end arm 26 welded to element 17, the end 16 then becomes an intermediate portion, and transverse portions 30 and 33 unite the ends, medians and the intermediate. Adjacent trefoils are joined together by spacers 12 similar to spacers 10 and the inner elements 13 of each trefoil are spaced from the inner element 14 of the rod by warts or button spacers 15 and 16 respectively.

With reference to FIGURE 3 the flexibility of spacer 10 (or 12), for relative longitudinal movements of elements 17 and 18, depends upon the diameter $d$ of the wire 10, the perpendicular distance $s$ between the arm 30 and the weld 31 or 32, and the separation $w$ of median 19 and the end 15. In a practical design relative axial displacements of adjacent elements of .06" have been achieved with an element spacing of .50" without exceeding the elastic limit of the spacer or element claddings.

Lateral deflection of elements is also affected by changing $d$, $s$ and $w$, but further lateral rigidity may be achieved by increasing the length of the spacer as described for portions 25 and 26. This also increases the stiffness for relative axial motion but does not affect the movement distance permitted.

Alternative shapes of spacers are possible. In FIGURE 4 the spacer 42 between two elements 40 and 41 is of hairpin shape, spot welded at 43, 44, 45 and 46. In FIGURE 5 spacer 50 is zig-zag and is continuously welded at 51 and 52. In these examples the flexibility again depends on diameter $d$, separation $w$, and distances $s'$ and $s''$. $s'$ is the perpendicular distance between the centre line of transverse portion 47 of the spacer 42 and the weld 44 or 43 (which is symmetrically placed). $s''$ is the perpendicular distance between the centre line of transverse portion 53 of spacer 50 and the end of weld 51 or 52. The spacers may also be of rectangular section in which case the cross section thickness corresponds to $d$ considered set from the plane within which the longitudinal axes of above.

Whereas in FIGURE 2 the spacers are shown as off-two adjacent elements lie, they may be placed on the line joining the axes as FIGURE 6 shows for spacers 55. This gives more positive element to element spacing.

The number of spacers arranged between any two adjacent elements may be varied and although shown at the centre of the fuel rod in FIGURE 1 may be arranged at intervals along the length if the particular application makes this desirable.

The transverse portion of each spacer may include a curved or bent portion to reduce stiffness to lateral movement between elements if desired without departing from the invention. The invention may also be employed with fuel rods without end plates.

If desired the spacers may be in staggered longitudinal planes as shown at 60 and 61 in FIGURE 7. End plates may also be used with this staggering.

In instances where the fuel elements are of the annular type 65 and 66 shown in FIGURE 8, the flexible spacers 67 similar to those already described may be oriented between the inner surface 68 of the outer element 66 and the outer surface 69 of the inner element 65.

We claim:

1. A rod type fuel element assembly comprising at least a pair of longitudinally extending fuel elements subject to differential movement, each of said elements including a thin metal sheath, a flexible spacer which comprises, a wire bent to form a pair of attachment portions and a transverse portion extending between the attachment portions, and means securing each attachment portion to the sheath of its adjacent element, said securing means being perpendicularly offset from the line of action of force between said elements acting through said transverse portion.

2. Apparatus as defined in claim 1, said attachment portions being parallel.

3. Apparatus as defined in claim 1, said attachment portions being spot welded to said sheaths.

4. Apparatus as defined in claim 1, said attachment portions being continuously welded to said sheaths.

5. Apparatus as defined in claim 1, said attachment portions comprising two colinear end portions attached to one element and a median portion attached to the adjacent element.

6. Apparatus as defined in claim 1, said spacer being hairpin shaped.

7. Apparatus as defined in claim 5, said wire comprising said spacer being bent to form a double crank, including a pair of co-linear attachment ends and an intermediate attachment portion, a pair of co-linear attachment median portions and four transverse portions alternately joining said end medians and intermediate portions.

8. Apparatus as defined in claim 1 comprising, a further flexible spacer extending between said elements, said further spacer being offset longitudinally of said elements from the first mentioned spacer.

9. Apparatus as defined in claim 1 comprising, at least three of said longitudinally extending elements, a further spacer extending between the sheath of one of said pair and the third of said elements, said further spacer being offset longitudinally of said elements from said first mentioned spacer.

References Cited
UNITED STATES PATENTS

| | | | |
|---|---|---|---|
| 3,068,163 | 12/1962 | Currier et al. | 176—78 |
| 3,212,991 | 10/1965 | Brynsvold et al. | 176—76 X |
| 3,287,231 | 11/1966 | Frisch | 176—76 X |

CARL D. QUARFORTH, *Primary Examiner.*

M. J. SCOLNICK, *Assistant Examiner.*